F. A. RUNGE.
MOTOR CULTIVATOR.
APPLICATION FILED DEC. 8, 1913.
1,218,121.
Patented Mar. 6, 1917.
2 SHEETS—SHEET 2.
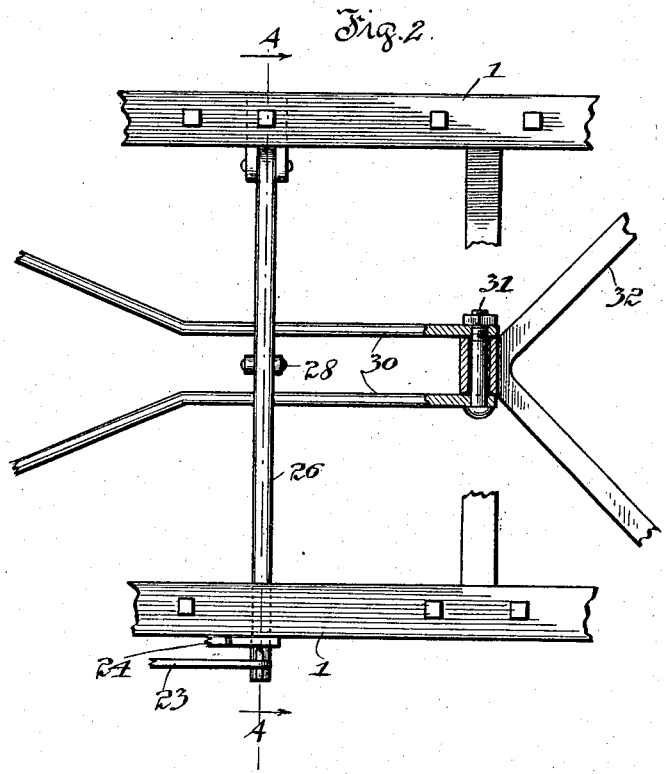
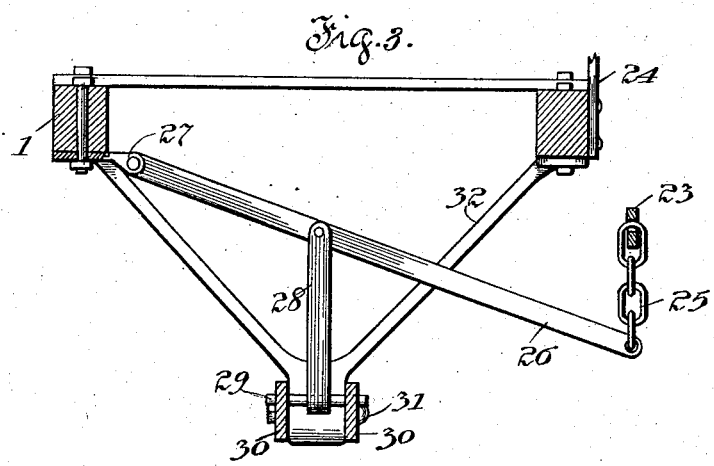

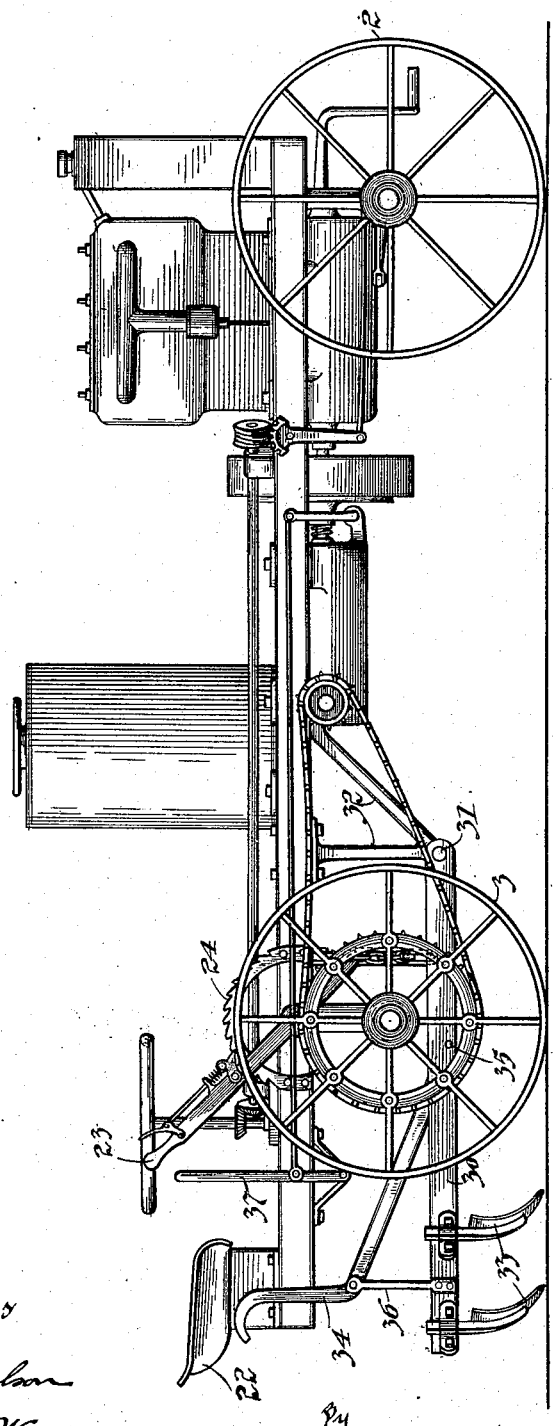

UNITED STATES PATENT OFFICE.

FRIEDRICH ALBERT RUNGE, OF SAN MARCOS, TEXAS.

MOTOR-CULTIVATOR.

1,218,121.      Specification of Letters Patent.      Patented Mar. 6, 1917.

Application filed December 8, 1913. Serial No. 805,402.

*To all whom it may concern:*

Be it known that I, FRIEDRICH ALBERT RUNGE, a citizen of the United States, residing at San Marcos, in the county of Hays and State of Texas, have invented certain new and useful Improvements in Motor-Cultivators, of which the following is a specification.

This invention relates to improvements in motor cultivators and its object is to provide a device of this class having manually operable means for adjusting the depth of the furrow and for moving the cultivator blades laterally in a limited degree independently of the frame of the machine.

With the foregoing and other objects in view the invention consists in the combination and arrangement of parts to be hereinafter fully described in the following specification, pointed out in the claim and illustrated in the accompanying drawings which form a part of said specification and in which—

Figure 1 is a side elevation of my improved motor cultivator.

Fig. 2 is a cross section.

Fig. 3 is a section taken on line 4—4 of Fig. 2.

Like reference characters indicate corresponding parts throughout the several views.

My cultivator comprises a frame 1 mounted upon front wheels 2 and rear drive wheels 3.

Within reach of the operator from his seat 22 is a lever 23, pivoted to the frame 1 and carrying a pawl adapted to engage the segment 24 also secured to the frame 1. To the lower end of the lever a chain 25 is secured that engages a lever 26 that extends beneath the frame 1 transversely and which is pivoted at one end in a piece 27 secured to the frame 1 and said lever is connected by a link 28 and pin 29 to a pair of bars 30, 30 which are pivoted at one end upon a shaft 31 carried by a support 32 depending beneath the frame; said bars 30, 30 carry the cultivator blades 33 and by means of the lever 23 and connections, just described, these bars 30 and blades 33 may be raised or lowered with respect to the frame 1. To the bars 30 angular levers 34 are secured as at 35 and further connected to said bars by links 36 and by means of said levers 34 the bars 30 may be moved laterally in a limited degree independently of the frame 1; the purpose of this movement may be to avoid a small hill in the path of the furrow or for other cause, the metal of which the bars are made being sufficiently flexible that, taken together with the manner in which said bars and their connections are assembled, this operation is possible.

What is claimed is:—

In a cultivator, a frame, flexible bars having their forward portions parallel and their rearward portions divergent from said forward portions, a pivotal support for the forward ends of said bars, a lever pivoted to one side of said frame and extending transversely of the same, connection between said lever and the said flexible bars, a second lever pivoted to the opposite side of said frame with relation to the aforesaid lever, connection between said levers; angular levers secured at their ends directly to said flexible bars whereby said bars may be moved laterally in a limited degree independently of said frame and cultivator blades carried by the rearward portions of said flexible bars.

In testimony that I claim the foregoing as my own I have hereto affixed my signature in the presence of two subscribing witnesses.

F. ALBERT RUNGE.

Witnesses:
     CECIL BROWN,
     T. C. JOHNSON, Jr.

Copies of this patent may be obtained for five cents each, by addressing the "Commissioner of Patents, Washington, D. C."